United States Patent [19]

Rosenberger

[11] Patent Number: 4,656,454

[45] Date of Patent: Apr. 7, 1987

[54] PIEZORESISTIVE PRESSURE TRANSDUCER WITH ELASTOMERIC SEALS

[75] Inventor: Mark E. Rosenberger, Freeport, Ill.

[73] Assignee: Honeywell Inc., Minneapolis, Minn.

[21] Appl. No.: 726,743

[22] Filed: Apr. 24, 1985

[51] Int. Cl.[4] .......................... G01L 1/22; G01L 9/04; H01L 10/10; H01L 41/08

[52] U.S. Cl. ........................................ 338/2; 338/4; 338/42; 29/610 SG; 73/720; 310/338

[58] Field of Search ........................................ 338/2-5, 338/42, 47; 73/720, 721, 726, 727; 29/610 SG; 361/283, 321, 308; 310/338

[56] References Cited

U.S. PATENT DOCUMENTS

| | | | |
|---|---|---|---|
| 2,751,530 | 6/1956 | Armstrong | 361/283 |
| 2,830,698 | 4/1958 | Coda et al. | 361/321 |
| 3,315,201 | 4/1967 | Werme | 338/2 |
| 3,417,361 | 12/1968 | Heller et al. | 338/42 |
| 3,455,165 | 7/1969 | Huet | 73/398 |
| 3,466,513 | 9/1969 | Belko, Jr. et al. | 361/308 X |
| 3,739,315 | 6/1973 | Kurtz et al. | 338/3 |
| 4,040,297 | 8/1977 | Karsmakers et al. | 338/42 X |
| 4,125,820 | 11/1978 | Marshall | 338/4 |
| 4,128,006 | 12/1978 | Grabow | 73/724 |
| 4,173,900 | 11/1979 | Tanabe et al. | 73/727 |
| 4,295,115 | 10/1981 | Takahashi et al. | 338/4 |
| 4,373,397 | 2/1983 | Keller | 73/721 |
| 4,528,855 | 7/1985 | Singh | 73/721 |
| 4,600,912 | 7/1986 | Marks et al. | 338/4 X |

OTHER PUBLICATIONS

Arthur R. Zias, et al, Technical Articles "Integration Brings A Generation of Low-Cost Transducers", Electronics, Dec. 4, 1972, pp. 83–88.

Primary Examiner—E. A. Goldberg
Assistant Examiner—Linda M. Peco
Attorney, Agent, or Firm—Charles L. Rubow

[57] ABSTRACT

A low cost piezoresistive pressure transducer utilizing premolded elastomeric seals and adapted for automatic assembly, and a method of producing the transducer. A piezoresistive stress sensitive element in the form of a diaphram of semiconductor material having a thickened rim is held at its rim between a pair of premolded elastomeric seals in a thermoplastic housing. Electrical connections with external circuitry are made with strain relief jumpers which connect conductive regions on the element outside the seals to conductors which pass through the housing wall.

18 Claims, 6 Drawing Figures

PIEZORESISTIVE PRESSURE TRANSDUCER WITH ELASTOMERIC SEALS

BACKGROUND OF THE INVENTION

The invention disclosed herein relates generally to semiconductor pressure sensing apparatus, and more particularly to such apparatus employing a piezoresistive stress sensitive element mounted in a low cost housing employing premolded elastomeric seals.

It is well known to package piezoresistive stress sensitive elements so that they are adapted to sense fluid pressure. In order to obtain an output indicative of fluid pressure, such a stress sensitive element must be interfaced with other structure in at least two respects which may have significant effects on the output of the element. Specifically, the element must be mechanically supported, and a fluid tight joint must be provided between the element and the support structure to enable fluid pressures to produce a force differential between different portions (typically opposite sides) of the element.

The quality requirements for the fluid tight joint may vary depending on the intended application of the pressure sensing assembly. A hermetic seal is generally required for high pressures or sensing pressures from low capacity static sources. Hermetic sealing can normally be achieved only with a hard seal, such as produced by soldering, welding thermocompression bonding, electrostatic bonding, etc.

For lower pressure applications involving constantly changing pressures or high capacity static sources, forming the joint with an adhesive or soft seal may be suitable. In any event, care must be taken to minimize stresses applied to the stress sensitive element by the seal and/or any mounting structure. Stresses in the stress sensitive element may be created by differences in the thermal coefficients of expansion of the element and any structure bonded thereto. Such stresses may also result from aging and contraction of adhesives and/or the force required to grip the stress sensitive element between seals.

A further disadvantage associated with adhesives is that they must be applied in an uncured form in which they are relatively fluid. Consequently, it is difficult to assure close control over the cured adhesive configuration, as is necessary to achieve satisfactory and consistent performance from piezoresistive transducers. The small size of the semiconductor chips and other transducer parts (typically tenths of an inch or less) increases the difficulty in achieving adequately precise control over the adhesive. Further, depending on the geometry of the parts, the uncured adhesive may tend to flow into depressions and cavities in which it is unwanted. Finally, the most common adhesives which exhibit satisfactory elasticity and other required characteristics when cured are not compatible with some fluids whose pressures must be sensed.

It is pointed out that because of basic differences in the mechanism by which pressure is sensed in piezoresistive stress sensitive elements and in other sensors, such as capacitive pressure cells, mounting and pressure seal techniques suitable for capacitive and other types of transducers may be difficult to satisfactorily implement in piezoresistive transducers. A reason for this is that in a capacitive transducer, the region of maximum sensitivity is at the center of a diaphragm structure. Therefore, a capacitive pressure cell may be readily gripped or supported and/or a pressure seal provided at the periphery of the cell without producing an unacceptable effect on the transducer output signal.

Conversely, a piezoresistive stress sensitive element is quite sensitive to forces applied at the periphery of its diaphragm. Therefore, the materials used for mounting means and pressure seals must be carefully chosen and the mounting means and seals carefully designed to avoid unacceptable effects on the output signal.

An apparent solution is to design the piezoresistive stress sensitive element such that the active diaphragm area with the piezoresistive device thereon is relatively small in diameter, and that the mounting and pressure seal is located at a substantially larger distance from the center of the diaphragm. Such an approach has several problems, including a requirement for a larger semiconductor chip which is expensive, increased physical size of the completed transducer when miniaturization may be preferred or required, and/or reduced sensitivity due to the small active diaphragm area.

A further consideration in the design of a piezoresistive pressure transducer involves insuring that the transducer is compatible with fluids whose pressures are to be sensed, and providing that the sensor design is compatible with as wide a range of fluids as possible. With reference to the semiconductor chip, the most critical area is that at which external electrical connections are made with the doped circuit elements. It is known to use a variety of conformal coatings to protect the electrical connections, as well as other chip features. For silicon substrates such coatings include varnishes, dimethyl silicone, silicon dioxide and silicon nitride.

Coatings such as varnishes are subject to aging effects and can affect transducer sensitivity and repeatability. Dimethyl silicone can also affect transducer sensitivity, repeatability, and response. With regard to silicon dioxide and silicon nitride, in order to facilitate the application, the coating is normally formed over the entire silicon surface rather than just the interface between the doped circuit elements and external conductors. As noted in U.S. Pat. No. 3,417,361 issued to H. Heller et al on Dec. 17, 1968, and discussed in detail in U.S. Pat. No. 4,125,820 issued to J. Marshall on Nov. 14, 1978, most metals are at least somewhat soluble in silicon, and silicon dioxide or silicon nitride will, during its formation, take up some kinds of dopants from the semiconductor substrate. This may alter the dopant concentration in the piezoresistors and/or other doped elements, and affect transducer performance. In addition, most usual coating materials, including silicon dioxide and silicon nitride, have significantly different thermal coefficients of expansion than silicon. The use of such coatings may result in thermal stresses which, in turn, will be reflected in the transducer output signal.

A further important consideration in pressure transducer design is an increasing demand for general cost reductions and for low cost transducers which meet moderate performance requirements. Thus, it has become increasingly important to devise piezoresistive pressure transducer designs which are adaptable for various modes of operation and usable with a variety of fluid media. Finally, low cost generally implies a design which utilizes low cost materials and is adaptable to automated assembly.

The applicant has devised a unique piezoresistive pressure transducer design utilizing a low cost housing and premolded elastomeric seals, which design reduces the need for protective coatings by locating the piezoresistive element-external circuitry interface outside of the area contacted by the fluid whose pressure is being sensed, and which is well suited for automated assembly.

SUMMARY OF THE INVENTION

The present invention is a low cost piezoresistive pressure transducer utilizing premolded elastomeric seals, and a method of producing such transducers. The transducer assembly basically comprises a semiconductor diaphragm having a piezoresistive device on a central portion thereof and conductive regions extending from the piezoresistive device to a peripheral portion of the diaphragm, the diaphragm being contained in a housing having a pressure port therein and a pair of opposing internal surfaces on opposite sides of the diaphragm configured to form seats for seals. A premolded elastomeric seal is located between each seat and the adjacent side of the diaphragm, and electrical conductors extend from the conductive regions at the peripheral portion of the diaphragm to the exterior of the housing.

The housing may comprise a side wall having a pair of opposing openings which are sealed with covers formed with the seats and one or more pressure ports. The diaphragm may be configured with a thickened rim so as to form a depression which may be evacuated and sealed with a glass plate to provide an absolute pressure reference. The electrical conductors may be arranged to pass through the side wall of the housing along an indirect route to reduce the possibility of leakage.

The method of the present invention basically comprises fabricating a semiconductor diaphragm having a piezoresistive stress sensitive device formed on its central portion and a peripheral portion to which electrically conductive regions are extended, and forming an enclosure having at least one opening and a cover fo closing the opening. The enclosure is configured to house the diaphragm and has a pair of internal surfaces on opposite sides thereof, the internal surfaces each being formed with a seat for a seal. According to the method, the stress sensitive element is positioned within the housing and electrical jumpers are connected between the conductive regions on the element and conductors in the enclosure. A premolded elastomeric seal is then positioned between each of the internal surfaces and the adjacent side of the diaphragm, and finally the opening in the enclosure is closed with the cover.

The jumpers may be formed as part of a lead frame in a connected succession of such lead frames. Similarly, the enclosure, exclusive of the covers, may be one of a succession of such items on a carrier strip used in an automated assembly process in which a semiconductor diaphragm is bonded to each lead frame, the jumpers severed from the remainder of the lead frame, the diaphragm with jumpers attached positioned within the enclosure, the jumpers bonded to electrical conductors in the enclosure, the seals fitted to the covers, the covers bonded to the remainder of the enclosure, and the completed transducer severed from the carrier strip.

DESCRIPTION OF THE PREFERRED EMBODIMENTS

Figure 1:
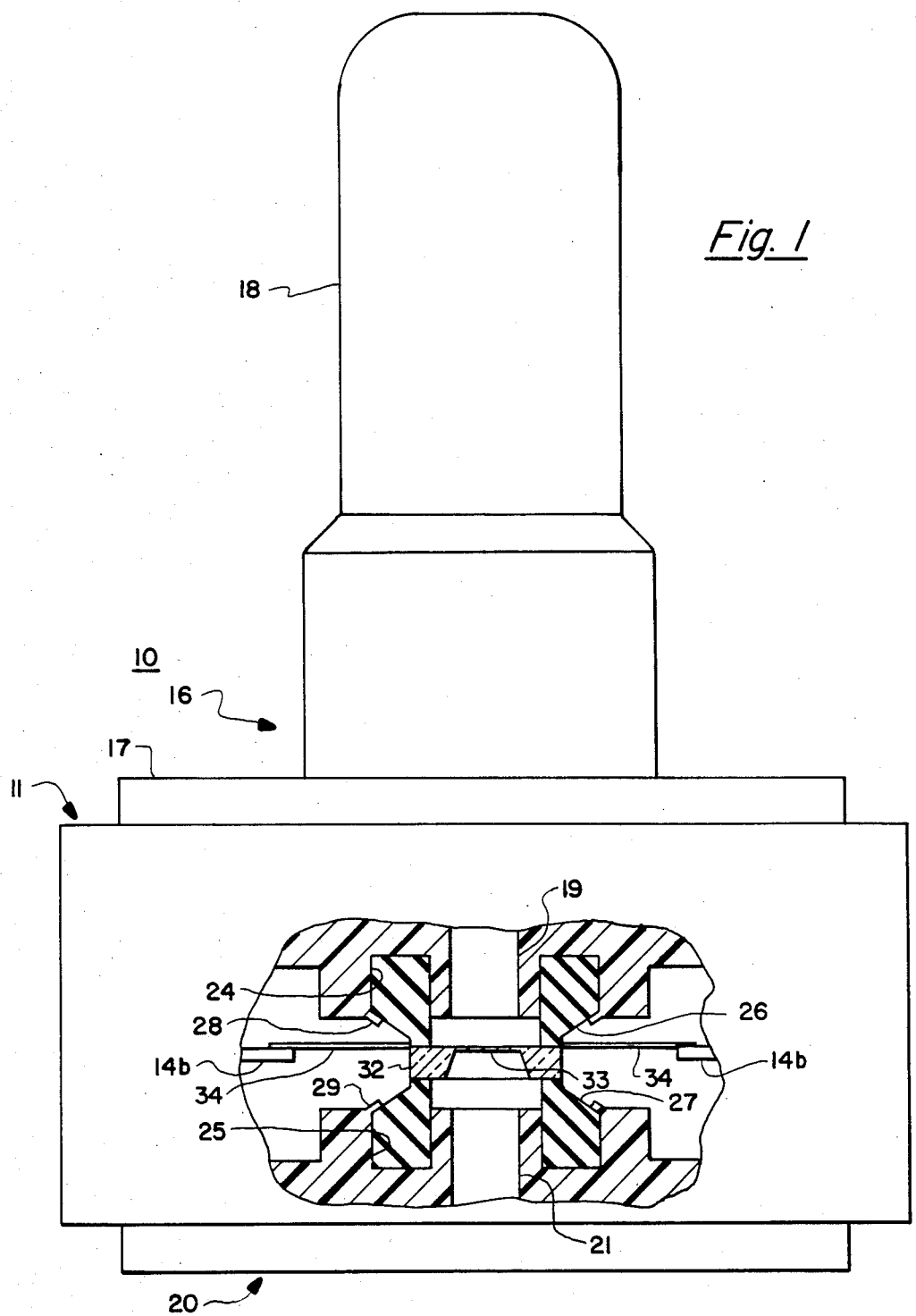
FIG. 1 is a side view of one embodiment of a piezoresistive pressure transducer in accordance with the applicant's invention, a portion of the housing being broken away to show internal details of the transducer.
Figure 2:
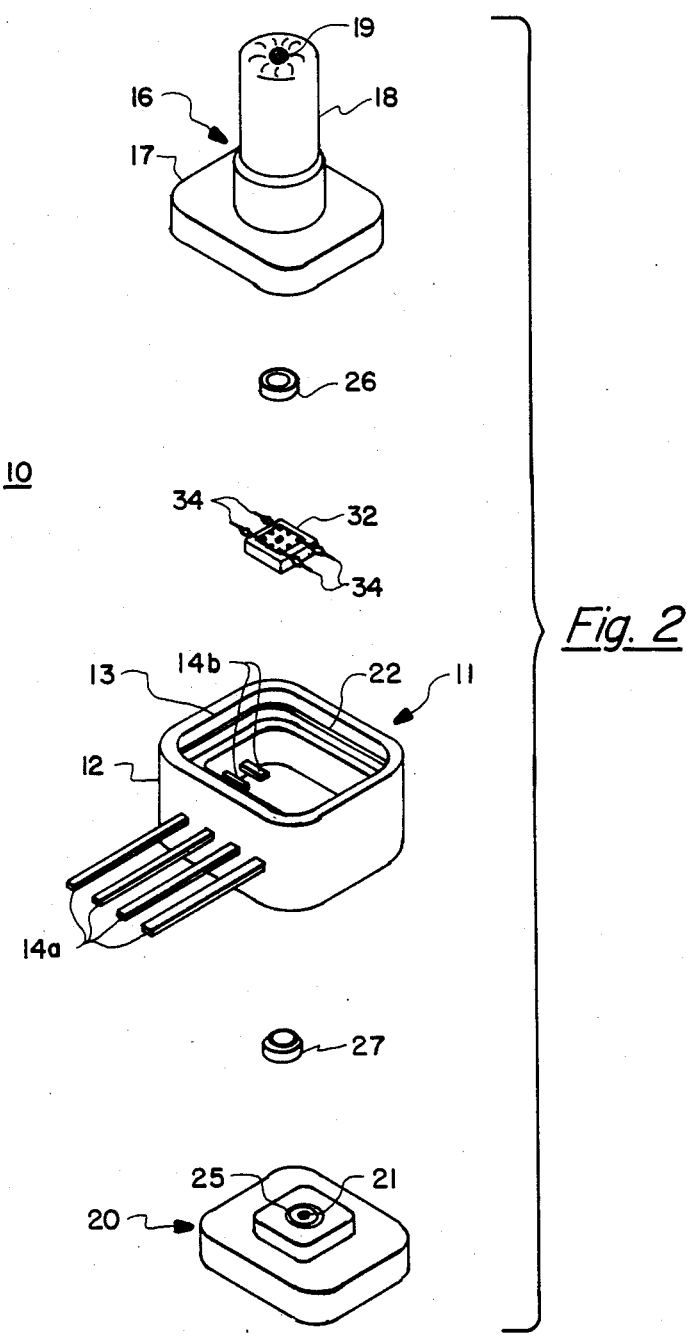
FIG. 2 is an exploded view of the transducer of FIG. 1.

In FIGS. 1 and 2, reference numeral 10 generally identifies a piezoresistive pressure transducer in accordance with the applicant's invention for sensing gauge pressure of a fluid. As shown in FIG. 2, transducer 10 includes an enclosure or housing comprising a body 11 having a side wall 12 and first and second opposing end openings, of which the first end opening is identified by reference numeral 13. Body 11 also includes a plurality of electrical conductors extending through wall 12. The outer and inner ends of the conductors are identified by reference numerals 14a and 14b respectively. The conductors pass through wall 12 along an indirect route as will be described in greater detail hereinafter.

Reference numeral 16 generally identifies a cover which closes first opening 13. Cover 16 is shown comprising a plate 17 which at least partially fits into opening 13 and a tubing connector 18 formed to snugly fit into the end of a section of tubing carrying pressure to be measured. Reference numeral 19 identifies a hole passing through cover 16 into the interior of body 11.

The second end opening in body 11 opposite first end opening 13 is closed with a cover generally identified by reference numeral 20. As shown, cover 20 is identical to cover 16 except that cover 20 is not provided with a tubing connector such as connector 18. Cover 20 is, however, provided with a hole 21 for providing an atmospheric pressure reference against which the gauge pressure in the tubing connected to connector 18 can be measured.

As shown, the first and second openings in body 11 are identical and covers 16 and 20 may be interchanged, or two identical covers of either type may be used depending on the intended application of the transducer. Body 11 and covers 16 and 20 are formed of a thermoplastic material and may be ultrasonically welded together. Opening 13 is shown with an intermediately shoulder 22 which forms the transition between the outer part of opening 13 and a slightly smaller inner part of the opening. Such a configuration facilitates the insertion of cover 16 and provides a close tolerance fit when the cover is inserted to produce a secure weld when the parts are ultrasonically joined.

The inner surfaces of covers 16 and 20 are formed with circular channels or grooves around holes 19 and 21, the channel in cover 20 being identified by reference numeral 25. The channels comprise seats for circular elastomeric seals identified by reference numerals 26 and 27. Seals 26 and 27 are premolded to a desired configuration which will be described in greater detail, and cured in that configuration.

The interior surfaces of covers 16 and 20 are configured with lips 28 and 29 surrounding channels 24 and 25 respectively. The lips are initially formed so that the outer walls of the channels are straight. However, after insertion of seals 26 and 27, the lips are swaged against the beveled surfaces of the seals to insure that the seals remain securely seated.

Reference numeral 32 identifies a square chip of semiconductor material, such as silicon, having a circular area of reduced thickness therein to form a central diaphragm 33. The upper surface of chip 32 is doped to provide an arrangement of piezoresistors and other conductive regions therein. The dopant pattern will be described in greater detail hereinafter in connection with FIG. 3.

Chip 32 with the piezoresistors therein forms a stress sensitive element comprising a central diaphragm portion and a thickened rim. Chip 32 is gripped at its rim or peripheral portion between seals 26 and 27 whose ends in contact with the chip have reduced outer diameters corresponding to the dimension between the edges of the chip. The seals are formed with increased diameters remote from chip 32 to facilitate handling of the seals because the dimensions of the chip and other transducer parts are small (typically a few tenths of an inch or less).

The electrically conductive regions in chip 32 are brought to the surface of the chip at the corners thereof outside seal 26. Electrical jumpers 34 are bonded to the chip at the corners thereof, and extend to interior ends of conductors 14b. The various parts of transducer 10 are designed so that the dimensions and spacings of the parts provide for a 10 to 35 percent compression of seals 26 and 27. This has been found sufficient to provide a satisfactory seal while avoiding the imposition of mechanical stresses on chip 32 which are large enough to adversely affect its output signal.

Figure 3:
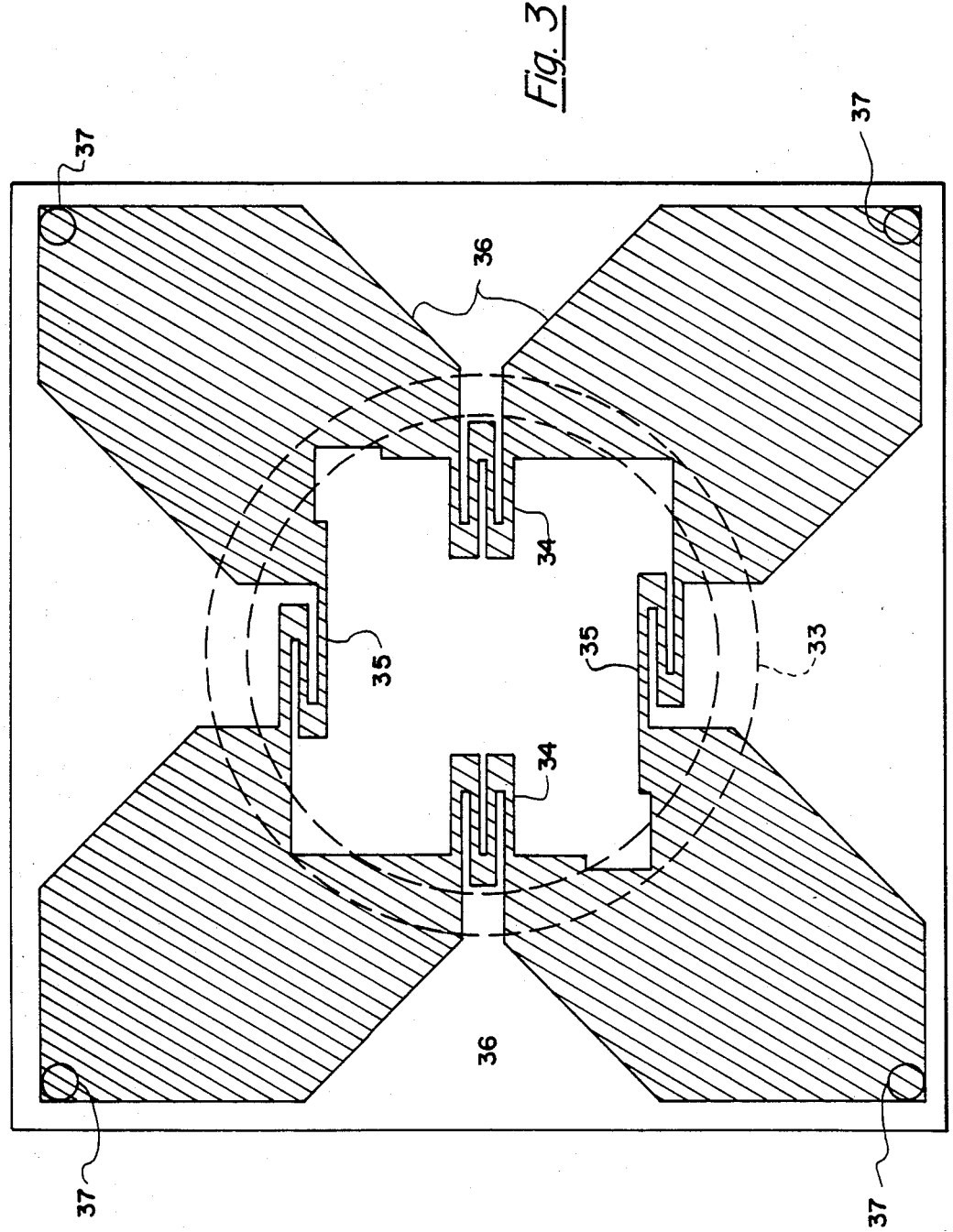
FIG. 3 is a plan view a semiconductor stress sensitive element used in the transducer of FIGS. 1 and 2, and showing the doped pattern thereon which forms the piezoresistors and interconnecting electrical regions.

With reference to FIG. 3, the shading represents the doped pattern in the upper surface of chip 32. The portions of the pattern identified by reference numerals 34 and 35 form piezoresistors sensitive to radial and lateral strain respectively. These piezoresistors are interconnected by means of conductive regions 36 into a Wheatstone bridge configuration. Regions 36 also provide for electrical communication with external circuitry. Specifically, electrically conductive regions 36 ar brought to the surface of chip 32 at locations identified by reference numerals 37, where they are bonded to jumpers 34 as indicated in connection with FIGS. 1 and 2. It is pointed out that because of the locations at which the jumpers are bonded to conductive regions 36, these connections are not exposed to fluids or contaminants which might cause adverse effects.

Figure 4:
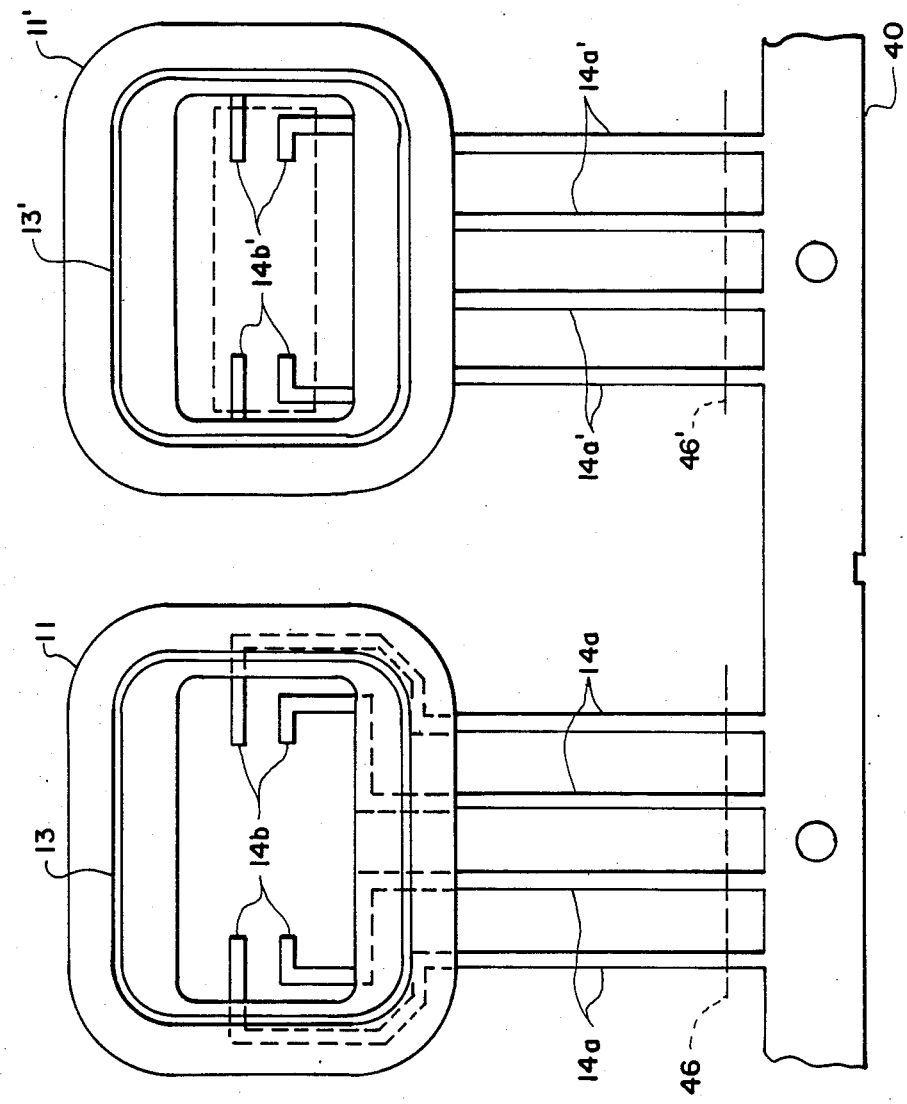
FIG. 4 is a plan view of two identical enclosure bodies with electrical conductors connected to a continuous carrier strip used in assembling the transducer of FIGS. 1 and 2 by automatic assembly processes.

A piezoresistive pressure transducer of the design disclosed herein is well adapted for production from inexpensive materials by means of automatic assembly processes. FIG. 4 illustrates two identical enclosure bodies 11 and 11' connected to a carrier strip 40 of which portions form electrical conductors 14a, 14b and 14a', 14b'. The conductors are formed and the bodies are molded around the conductors so that the conductors follow an indirect route, as shown in the left hand enclosure body, between the exterior and interior thereof. This indirect routing helps to insure a good seal between the body and the conductors. As so formed on the carrier strip, the bodies can be reeled onto a reel used in an automatic assembly machine.

Figure 5:
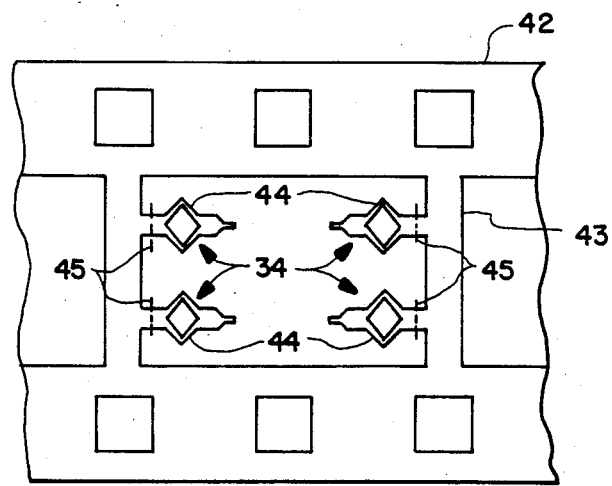
FIG. 5 is a plan view of a section of continuous metal tape which forms connected lead frames used in automatic assembly of the transducer of FIGS. 1 and 2.

In FIG. 5, reference numeral 42 identifies a metal tape of which portions have been etched away to provide a lead frame 43 comprising electrical jumpers 34 attached to a carrier. Jumpers 34 are configured with stress relief sections 44 which minimize the transmission of any stresses to chip 32. Thus, the output signal of the stress sensitive element is not unduly affected by stresses transmitted through the electrical connections.

In the automatic assembly process, a chip 32 is positioned in registration with jumpers 34 in a lead frame 43 and the free ends of the jumpers are thermocompression bonded to the corner conductive pads on the chip. Jumpers 34 are then severed from the remainder of lead frame 43 as indicated at 45. A chip with jumpers attached is then positioned within an enclosure body 11 and the outer ends of jumpers 34 are soldered to inner ends of conductors 14b.

A pair of elastomeric seals 26 and 27 are then inserted into the channel seats in covers such as 16 and 20, and the lips surrounding the channels swaged to secure the seals in place. The covers are then inserted into the openings in the enclosure body and ultrasonically welded in place. Finally, the electrical conductors are severed from carrier strip 40 as indicated at 46 in FIG. 4.

As is apparent from the foregoing description of the applicant's design, all electrical connections are made at a location not exposed to a fluid whose pressure is being measured. Further, the electrical connections are made in an area sealed from the environment surrounding the pressure transducer. Thus, the need for and problems associated with protective coatings are reduced. In addition, the seals may be formed of any of a wide variety of elastomeric materials. Since some known elastomeric material compatible with almost any fluid can be produced in premolded form, the present design is adaptable to a wide range of applications. In addition, minor alterations in the selection of parts permits a pressure transducer of the present design to be used in measuring gauge, differential or absolute pressure.

Figure 6:
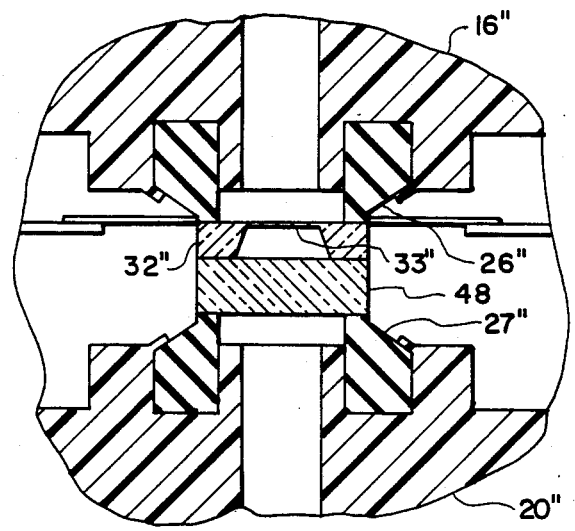
FIG. 6 is a partial sectional view of a piezoresistive pressure transducer in accordance with the applicant's invention configured for sensing absolute pressure.

FIG. 6 illustrates the modifications necessary for use in absolute pressure sensing applications. In FIG. 6 the parts common to the embodiment of FIGS. 1 and 2 are identified by the same reference numerals with the addition of double prime notations. The embodiment of FIG. 6 differs from the embodiment of FIGS. 1 and 2 primarily in that a glass cover 48 is bonded to the side of chip 32" opposite diaphram 33" while the space within the rim of the chip is evacuated so as to provide a vacuum reference. The only remaining difference involves minor alterations of parts, dimensions and/or spacings to accommodate the thickness of glass plate 48.

In accordance with the foregoing description, the applicant has provided a unique, low cost, highly versatile piezoresistive pressure transducer design. Two specific embodiments have been shown and described for illustrative purposes. However, a number of variations and modifications within the applicant's contemplation and teaching will be apparent to those of ordinary skill in the relevant arts. It is not intended that coverage be limited to the disclosed embodiment but only by the terms of the following claims.

The embodiments of the invention in which an exclusive property or right is claimed are defined as follows:

1. A method of producing a pressure transducer assembly comprising the steps of: providing a semiconductor stress sensitive element having a central diaphragm portion on which a piezoresistive device is formed and a peripheral portion to which electrically conductive regions are extended from the piezoresistive device;

providing an enclosure configured to house the stress sensitive element and to have a pair of openings on opposite sides of the central diaphragm portion thereof, the enclosure including electrical conductors extending between the inside and outside thereof;

providing a pair of covers adapted to close the pair of openings in the enclosure, each cover having an internal surface formed with a seat for a seal;

positioning the stress sensitive element within the enclosure;

connecting separate electrical jumpers between the conductive regions on the stress sensitive element and the conductors within the enclosures;

providing a pair of elastormeric seals, each being molded in a configuration to extend from the seat on one of the internal surfaces of a cover to the stress sensitive element when the cover is in place, the seals further being configured to contact the surface of the stress sensitive element at a location surrounding the central diaphragm portion thereof;

fitting an electomeric seal in each of the seats; and securing the covers fitted with the seals to the enclosure so as to close the pair of openings therein and form a pressure tight seal between the covers and the diaphragm.

2. The method of claim 1 wherein the step of connecting electrical jumpers comprises the further steps of:

forming a lead frame including portions adapted to serve as the electrical jumpers;

bonding the stress sensitive element to the lead frame so that the jumper portions of the lead frame are separately electrically connected to the conductive regions on the stress sensitive element;

severing the jumper portions of the lead frame from the remainder of the lead frame; and bonding the jumpers attached to the stress sensitive element separately to conductors within the enclosure.

3. The method of claim 2 wherein:

the seat on each cover comprises a channel on the internal surface of the cover, the channel being surrounded by a lip; and the step of fitting the seals comprises locating a seal in each channel and swaging the lip surrounding the channel onto the seal.

4. The method of claim 3 wherein;

the stress sensitive element is one of a plurality of substantially identical elements;

the enclosure is one of a plurality of substantially identical enclosures connected in a succession;

the lead frame is one of a plurality of substantially identical lead frames connected in a succession;

the stress sensitive elements are separately bonded to successive lead frames;

the jumpers in successive lead frames are severed from the remainders of the lead frames;

the stress sensitive elements with jumpers attached are separately positioned within successive enclosures;

the stress sensitive elements with jumpers attached are separately bonded to the conductors within successive enclosures;

a separate pair of covers, each fitted with an elastomeric seal, are bonded successively to the enclosures in the pair of openings therein; and the enclosures are severed from one another to provide separate pressure transducer assemblies.

5. The method of claim 4 wherein the jumper portions of the lead frames are thermocompression bonded to the conductive regions of the stress sensitive elements and soldered to the electrical conductors within the enclosures.

6. The method of claim 5 wherein the enclosures are formed of a thermoplastic material and the covers are ultrasonically welded to the remainders of the enclosures.

7. The method of claim 6 wherein the seals are configured so as to be compressed from 10 to 35 percent when the covers are positioned to be welded to the remainders of the enclosures.

8. The method of claim 7 wherein one cover of each pair of covers is formed with a pressure port adapted to be supplied with a pressure to be sensed.

9. The method of claim 8 wherein both covers of each pair of covers are formed with pressure ports to provide a differential pressure transducer assembly.

10. The method of claim 8 wherein:

the peripheral portion of each stress sensitive element forms a rim around the central diaphragm portion, the rim being on the opposite side of the diaphragm portion from the cover with the pressure port; and the space within the rim is evacuated to form a vacuum therein and sealed with a glass cover.

11. A pressure transducer assembly comprising:

a diaphragm of semiconductor material having a central portion with a piezoresistive device formed thereon and electrically conductive regions extending from the piezoresistive device to a peripheral portion of said diaphragm;

a housing containing said diaphragm and having a pressure port therein, said housing having first and second opposing internal surfaces configured to form first and second seats for seals on opposite sides of said diaphragm;

first and second elastomeric seals located between said diaphragm and the first and second seats respectively, each of said seals being molded in a configuration to extend from the seat on one of the internal surfaces of said housing to a surface of said diaphragm at a location surrounding the central portion thereof, said housing being adapted to hold said first and second seals and said diaphragm between the first and second seats so as to form a pressure tight seal between said housing and said diaphragm on opposite sides thereof; and electrically conductive means connected to the conductive regions at the peripheral portion of said diaphragm and extending to the exterior of said housing.

12. The transducer assembly of claim 11 wherein said housing comprises:

a side wall, and a first cover forming the first internal surface of said housing, said first cover being adapted to be sealed to said side wall.

13. The transducer assembly of claim 12 wherein said housing comprises a second cover forming the second internal surface of said housing, said second cover being adapted to be sealed to the side wall.

14. The transducer assembly of claim 13 wherein said first cover is provided with a pressure port adapted to be supplied with a pressure to be sensed, the pressure port communicating with a chamber bounded by the central portion of said diaphragm, said first elastomeric seal and said first cover.

15. The transducer assembly of claim 14 wherein:
   said diaphragm is configured with a peripheral rim extending toward said second cover;
   the space within the rim is evacuated to form a vacuum therein and the open end of the rim sealed with a glass plate so as to provide an absolute pressure sensor.

16. The transducer assembly of claim 14 wherein said second cover has a pressure port therein, the pressure port communicating a chamber bounded by the central portion of said diaphragm, said second elastomeric seal and said second cover, whereby the transducer assembly is adapted to sense a pressure differential between the pressure ports in said first and second covers.

17. The transducer assembly of claim 12 wherein said electrically conductive means comprises:
   electrical conductors which pass through said side wall of said housing along an indirect route so as to increase the area of contact between the surfaces of said conductors and said side wall to minimize pressure leakage; and
   electrical jumpers which connect the conductive regions on said diaphragm to said electrical conductors within said housing.

18. The transducer assembly of claim 17 wherein said electrical jumpers each include a strain relief between the electrical conductor associated therewith and said diaphragm.

* * * * *